(12) United States Patent
Müller et al.

(10) Patent No.: US 11,661,962 B2
(45) Date of Patent: May 30, 2023

(54) CONNECTION SYSTEM FOR CONNECTING AT LEAST TWO, IN PARTICULAR PLATE-LIKE, ELEMENTS; ARRANGEMENT COMPRISING SUCH A CONNECTION SYSTEM

(71) Applicant: J. Schmalz GmbH, Glatten (DE)

(72) Inventors: Daniel Müller, Haiterbach (DE); Ernst Thielicke, Reutlingen (DE); Steffen Beck, Egenhausen (DE); Dennis Keck, Horb a.N. (DE); Kai Kunzmann, Baiersbronn (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 17/477,635

(22) Filed: Sep. 17, 2021

(65) Prior Publication Data

US 2022/0090614 A1  Mar. 24, 2022

(30) Foreign Application Priority Data

Sep. 18, 2020 (DE) ...................... 10 2020 124 448.7

(51) Int. Cl.
*F16B 5/02* (2006.01)
(52) U.S. Cl.
CPC ...................... *F16B 5/02* (2013.01)
(58) Field of Classification Search
CPC ........ F16B 5/02; F16B 5/0642; F16B 5/0241; F16B 5/58; F16B 37/044
See application file for complete search history.

(56) References Cited

U.S. PATENT DOCUMENTS

| 2,681,679 | A | * | 6/1954 | Poupitch | ............... F16B 37/042 411/113 |
| 3,785,421 | A | | 1/1974 | Launay | |
| 2004/0033121 | A1 | | 2/2004 | Clinch et al. | |
| 2018/0266476 | A1 | * | 9/2018 | Linka | .................... F16B 37/046 |

FOREIGN PATENT DOCUMENTS

| DE | 1941526 U | 6/1966 |
| DE | 6948314 U | 12/1971 |
| DE | 29804397 U1 | 7/1999 |
| DE | 102017116856 A1 | 1/2019 |
| DE | 102017116858 A1 | 1/2019 |
| EP | 2505449 B1 | 6/2016 |
| FR | 2241213 A5 | 3/1975 |
| GB | 1265583 | 3/1972 |

OTHER PUBLICATIONS

EP Search Report, dated Feb. 11, 2022, pp. 1-6.
German Office Action, pp. 1-8.

* cited by examiner

*Primary Examiner* — Jason L Vaughan
*Assistant Examiner* — Amanda Kreiling
(74) *Attorney, Agent, or Firm* — George McGuire (57) ABSTRACT

The invention relates to a connection system for connecting at least two plate-like elements, the connection system having a bolt, a nut that corresponds to the bolt and has a screwing channel which extends along a screwing axis and into which the bolt can be screwed, and a cage for receiving the nut, wherein the nut has a foot portion and a head portion adjoining the foot portion along the screwing axis, the foot portion projecting, at least in portions, beyond the head portion in a direction perpendicular to the screwing axis.

18 Claims, 8 Drawing Sheets

CONNECTION SYSTEM FOR CONNECTING AT LEAST TWO, IN PARTICULAR PLATE-LIKE, ELEMENTS; ARRANGEMENT COMPRISING SUCH A CONNECTION SYSTEM

CROSS-REFERENCE TO RELATED APPLICATION

The present application relates and claims priority to German Patent Application No. 10 2020 124 448.7 filed on Sep. 18, 2020, the disclosure of which is incorporated herein by reference in its entirety.

BACKGROUND

The invention relates to a connection system for connecting at least two, in particular plate-like, components, having the features of the preamble of claim 1, and to an arrangement having the features of the preamble of claim 15.

Various connection and fastening systems are known. It may be desirable to design a screwed connection comprising a bolt and an associated nut such that said connection interconnects two elements and only has to be accessed from one side for this purpose. This is particularly desirable when it is difficult to apply a tool to the nut because there is not sufficient space available for this. Such connection systems are used, for example, when assembling metal profiles or when setting up gantries.

DE 10 2017 116 858 A1 thus describes, for example, a fastening element for fastening to a mounting rail, the fastening element having a hammer head bolt which is accommodated in a U-shaped clip such that the hammer head bolt can be pivoted about an axis.

DE 10 2017 116 856 A1 proposes a rectangular tubular mounting rail having a hammer head bolt as a fastening element. The mounting rails are designed to have depressions which extend in the longitudinal direction and in which a disk-shaped abutment of the fastening element can be countersunk, which abutment is arranged on a shank of a bolt of the fastening element.

SUMMARY OF THE INVENTION

The object of the invention is to provide a connection system which is intended for connecting two, in particular plate-like, elements or components and which can be conveniently fastened from one side.

This object is achieved by a connection system comprising a bolt and a nut corresponding to the bolt. The nut has a screwing channel which extends along a screwing axis. The bolt can be screwed into this screwing channel. The screwing channel preferably has an internal thread at least in some portions. In this way, for example, an ordinary bolt can be screwed in.

The connection system further comprises a cage for receiving the nut. This cage is used to hold the nut when screwing in the bolt, in particular without the nut having to be counter-held using a wrench.

The nut has a specific shape, having a foot portion and a head portion adjoining said foot portion along the screwing axis. The foot portion projects, at least in portions, beyond the head portion in a direction perpendicular to the screwing axis. In other words, the foot portion, viewed along the screwing axis, has a larger cross-sectional area than the head portion. In this respect, the nut can be designed as a hammer head nut, with the foot portion protruding beyond the head portion in the manner of a hammer.

The mentioned design makes it possible for the head portion of the nut to extend through the elements or components to be fastened to one another and for the foot portion to rest against one of the elements or components. By screwing in the bolt, the elements/components to be fastened are then pressed against one another, with laterally acting forces being absorbed by the head portion of the nut. Since the nut is received in the cage when the bolt is screwed in, easy operation from one side is possible, in particular without counter-securing the nut using a wrench.

The foot portion and the head portion of the nut preferably merge into one another in a stepped manner. In particular, the foot portion and the head portion together form a step. In this respect, an inner edge can extend between the foot portion and the head portion, in which edge a lateral surface of the head portion meets a surface of the foot portion substantially at right angles.

The screwing channel preferably extends through the head portion and through the foot portion. The screwing channel can in particular be in the form of a through-opening through the head portion and the foot portion. In other words, the screwing channel extends in particular at least through the head portion of the nut such that the bolt can be screwed into the nut and in particular into the head portion of the nut. A through-opening allows the use of bolts of different lengths.

It can be advantageous for the head portion and/or the foot portion to have an upper side which extends in particular substantially perpendicularly to the screwing axis, the upper side being flat, in particular smooth. Within the meaning of the present application, smooth means that the upper side in particular has no corrugations. This design measure can be dispensed with in the connection system described, since forces acting laterally to the screwing axis are largely absorbed by the nut (in particular the head portion).

In particular, the upper side of the head portion and/or the foot portion is arranged perpendicularly to the screwing axis. In particular, the upper side of the foot portion is designed to rest against a surface of the elements to be connected and to press said elements against one another.

The cage preferably has a base portion and a lateral portion adjoining the base portion. The cage can delimit a receiving space for the nut. The lateral portion can then have at least one aperture through which the nut can be pushed into the receiving space at least in part. The base portion of the cage can be flat, have elevations and/or depressions and/or be, for example, corrugated in order to prevent the nut from slipping out.

It can be advantageous for the cage to have a cover portion, the cover portion adjoining the lateral portion and being arranged at a distance from the base portion. Here, too, analogously to the base portion, it is conceivable for the cover portion of the cage to be able to be flat, have elevations and/or depressions and/or be, for example, corrugated in order to prevent the nut from slipping out. The nut is largely stabilized in the cage by the cover portion, such that the bolt can be screwed in in a convenient manner.

A bolt opening for the passage of the bolt is preferably provided in the base portion and/or the cover portion. The bolt opening in the base portion and the bolt opening in the cover portion can have the same shape and/or size. It is also conceivable for the bolt opening in the base portion and the bolt opening in the cover portion to have different shapes and/or sizes, since the bolt opening does not necessarily have to provide a guiding function for the bolt.

It can be advantageous for the cage and the nut to be designed such that the nut can be pushed through the aperture in the lateral portion into the receiving space in the direction perpendicular to the screwing axis, such that the screwing channel is aligned with the bolt opening in the base portion and/or the bolt opening in the cover portion. For the connection, the bolt can then be screwed through the bolt opening in the cover portion into the screwing channel of the nut. The bolt or the nut is largely secured such that unintentional falling out of the cage can be prevented. Preferably, when the nut is pushed into the receiving space, the head portion is completely received in the receiving space. In this case, the foot portion can protrude, at least in part, beyond the receiving space through the aperture in the lateral portion.

It can be advantageous for the lateral portion of the cage to have at least one inner surface facing the receiving space, in particular two opposite inner surfaces. The inner surface can provide a contact surface for a side surface of the foot portion and/or a side surface of the head portion such that when the nut is pushed into the receiving space, the nut is secured against rotation about the screwing axis. In particular, the contact surface can be flat, have elevations and/or depressions and/or be, for example, corrugated in order to prevent the nut from slipping out.

In particular, the nut has two opposite, flat surfaces. In particular, the side surface of the head portion and the side surface of the foot portion lie in one plane. In this respect, the nut is preferably designed to be flat on two opposite sides (each of the flat surfaces then comprises one of the mentioned side surfaces of the foot portion and the adjoining side surface of the head portion). The foot portion of the nut projects, in particular at two opposite ends, beyond the head portion, but extends flush with the head portion between the two projecting regions (such that the flat surface is formed on the side of the nut). Generally speaking, the head portion and the foot portion, viewed in the projection of the screwing axis, are preferably of the same width, but the foot portion is longer than the head portion and therefore protrudes beyond the head portion.

The cage preferably has a cylindrical, in particular circular-cylindrical, outer shape. As a result, the cage can be pushed into or inserted through an aperture in the elements to be connected.

The base portion and/or the cover portion can, for example, extend in a flat manner and have a round, in particular circular, outer circumference.

In another design, it is conceivable for the base portion, viewed in projection along the screwing axis, to be larger than the cover portion. In particular, viewed in projection along the screwing axis, the base portion can protrude beyond the cover portion in the region of the aperture. In other words: in the plan view of the connection system, the cover portion and, in part, the base portion of the connection system can be seen. In the view from below of the connection system, only the base portion can be seen. This makes it possible to insert the cage, by its base portion, through corresponding holes or elongate holes in the components to be connected, with the cage then nevertheless still being able to be rotated and/or slid in an elongate hole due to the smaller diameter of the cover portion.

At least two projections are preferably provided on the cage, for example in the manner of projecting wings or tabs. The projections are arranged in particular on the lateral portion of the cage and/or on the cover portion of the cage and extend, in the screwed together state, in particular away from the screwing axis and are in particular arranged rotationally symmetrically and/or opposite one another with respect to the screwing axis. Preferably, exactly two projections are provided, which are arranged on opposite sides of the cage. This allows the projections and thus the cage to be operated with one hand using two fingers. More preferably, three projections can be arranged on the cage such that the cage can be operated with one hand using three fingers. The three-finger grip is particularly stable and comfortable to operate. In particular, the distance between the projections can be the same.

At least one resilient element is preferably provided on the base portion. The resilient element can push the nut, in particular the foot portion, away from the base portion in the assembled state of the connection system. In other words, the resilient element presses the nut away from the base portion toward the bolt or toward an optionally present cover portion. In this way, in the assembled state, the nut is preloaded against the bolt head, in particular along the screwing axis. The resilient element can protrude into the receiving space of the cage or be designed such that it protrudes away from the receiving space or the lateral portion.

The resilient element can extend radially outward in a wing-like manner from the base portion and/or the lateral portion, that is to say radially away from the screwing axis. However, it is also conceivable for the resilient element to extend radially inward, that is to say radially toward the screwing axis.

Two resilient elements are particularly advantageously provided, which elements are arranged in particular on opposite sides of the base portion.

The object to be achieved is further achieved by the arrangement according to the invention having the features of the additional independent claim. In this respect, the arrangement represents a kit and comprises a connection system having the features described above, a first, in particular plate-like, element or component and a second, in particular plate-like, element or component, the first element and/or the second element each having at least one hole. The hole has a shape corresponding to the nut and/or to the base portion of the cage, such that the cage, together with the received nut, can be introduced into the hole.

In another design, the first element and/or the second element has a first elongate hole having two long sides. The distance between the long sides can correspond to the base portion of the cage such that the cage, together with the received nut, can be introduced into the elongate hole and the connection system can be moved along the elongate hole. It is possible to move the connection system along the first elongate hole independently of a rotation of the connection system about the screwing axis.

The first element and/or the second element advantageously has a second elongate hole having two long sides, the second elongate hole having a shape corresponding to the base portion of the cage at at least one point. At this point, the distance between the two long sides can be greater than at another point of the second elongate hole, such that the movement of the connection system along the elongate hole can be blocked, in particular by rotating the cage by 90° about the screwing axis. The connection system can be introduced into the second elongate hole and pulled out again only at these points.

The connection system and the two elements are advantageously designed such that the first and the second element can be positioned between the nut and the cage, so that the cage, together with the nut, encloses the two elements. The two elements can be held together or pressed together by the cage and the nut, for example as an assembly aid.

BRIEF DESCRIPTION OF THE DRAWINGS

Further features, details and advantages of the invention can be found in the wording of the claims and in the following description of embodiments with reference to the drawings, in which:

DETAILED DESCRIPTION

In the following description and in the figures, corresponding components and elements have the same reference signs. For the sake of clarity, not all reference signs are shown in all figures.

Figure 1:
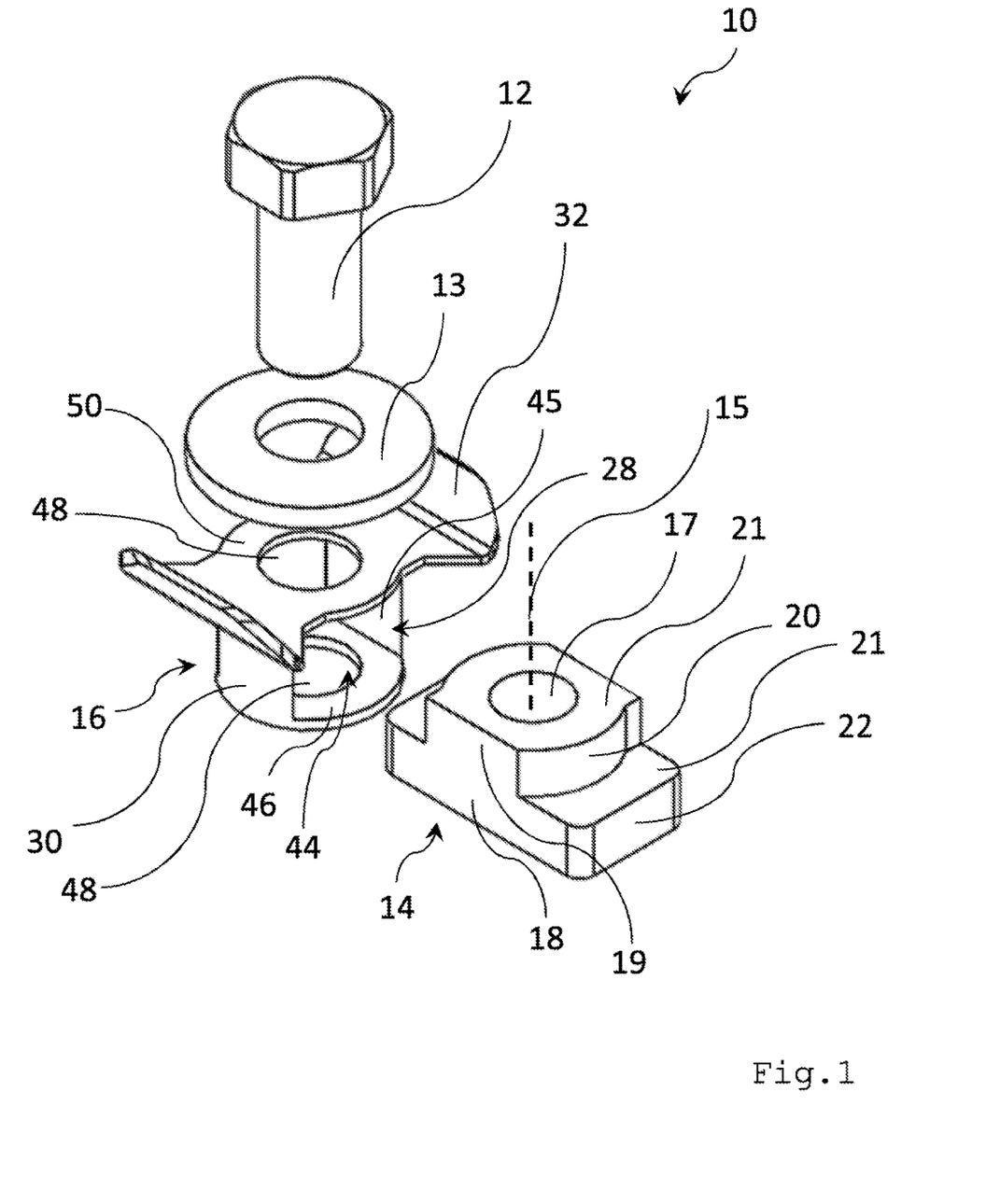
FIG. 1 is a perspective view of a connection system in a disassembled state.

FIG. 1 is a perspective view of a connection system 10 according to the invention in a disassembled state. The connection system 10 comprises a bolt 12 and a nut 14. The bolt 12 is shown only schematically and without an external thread. The nut 14 has a screwing channel 17 which, in the present case, is in the form of a through-opening and which extends along a screwing axis 15. The screwing axis 15 is shown in FIG. 1 by a dashed line. The screwing channel 17 has an internal thread (not shown) which corresponds to the external thread (likewise not shown) of the bolt 12 such that the bolt 12 can be screwed into the screwing channel 17 of the nut 14.

The nut 14 has a foot portion 22 and a head portion 20 adjoining the foot portion 22 along the screwing axis 15. The nut 14 is formed in one piece in the present case. However, it is conceivable to design the nut 14 to consist of a plurality of elements. For example, the head portion 20 of the nut 14 can be formed in one piece and the foot portion 22 of the nut 14 can be formed in one piece.

In the present case, the foot portion 22 merges into the head portion 20 in a stepped manner. The flow portion 22 protrudes beyond the head portion on two opposite sides of the head portion or foot portion 20, 22, such that a step shape is formed on each of these opposite sides.

The head portion 20 has a side surface 19 and the foot portion 22 has a side surface 18. In the present case, these two surfaces are in the form of a common flat side surface.

The head portion 20 has an upper side 21 which is arranged perpendicularly to the screwing axis 15 and which is flat in the present case. The foot portion 22 also has a surface 21 arranged perpendicularly to the screwing axis 15, i.e., in parallel with the upper side 21 of the head portion 20. The upper side 21 of the foot portion is also flat. In particular, the upper sides 21 do not have any corrugations, since lateral forces (acting along the surfaces of the elements to be fastened) are absorbed by the head portion 20.

The head portion 20 has a substantially round outer shape on two opposite sides, on which sides the foot portion 22 and the head portion 20 form a step shape.

The foot portion 22 and the head portion 20, viewed in projection along the screwing axis 15, each have a width and a length. The width of the foot portion 22 is preferably substantially the same as the width of the head portion, such that the nut 14 has a substantially flat side surface overall. The foot portion 22 is, however, preferably longer than the head portion 20, such that the foot portion 22 projects, at least in portions, beyond the head portion 20 in a direction perpendicular to the screwing axis 15. In another design, the length and width of the head portion 20 can be substantially the same size. In the case of the foot portion 22, however, the length is preferably greater than the width. In particular, the foot portion 22, viewed in projection along the screwing axis 15, is substantially rectangular.

The connection system 10 also has a cage 16. In the present case, the cage 16 has a base portion 46, a lateral portion 30 adjoining said base portion, and a cover portion 50 adjoining the lateral portion 30. The base portion 46 is flat or planar and has a bolt opening 48 and a circular outer shape. The cover portion 50 is also flat or planar and has a bolt opening 48, which in the present case has the same size and shape as the bolt opening 48 in the base portion 46. The cover portion 50 has a substantially round outer shape.

Projections 32 are arranged on the cover portion 50 on two opposite sides. In the present case, the projections 32 are collar-like or wing-like and extend radially outward from the cover portion 50.

The cage 16 forms a receiving space 44 for the nut 14. in the present case, the receiving space 44 is delimited the base portion 46, the lateral portion 30 and the cover portion 50.

The lateral portion 30 has two apertures 28 which are arranged on opposite sides of the lateral portion 30. Through these apertures 28, the nut 14 can be pushed into the cage 16 and thus into the receiving space 44 intended for the nut 14.

In the present case, two opposite sides of the lateral portion 30 are flat on their inner surface 45, i.e., surfaces facing the receiving space 44. These inner surfaces 45 are designed such that the nut 14, when it is pushed into the cage 16, rests so as to have the side surfaces 18 and 19 on the inner surfaces 45. The nut 14 is thus secured in relation to the cage 16 against rotation about the screwing axis 15. Thus, the cage 16, together with the received nut 14, can be securely rotated and operated via the two projections 32.

In the example shown, a washer 13 is shown. To assemble the connection system 10, the nut 14 is pushed through one of the two apertures 28 into the receiving space 44 such that the bolt openings 48 in the base portion 46 and in the cover portion 50 are aligned with the screwing channel 17. When the nut 14 is received in the cage 16 or the receiving space 44 thereof, the connection system can be operated by the extensions 32. Thereafter, the bolt 12 is optionally first inserted or screwed through the washer 13, then through the bolt opening 48 in the cover portion 50, through the screwing channel 17 of the nut 14, and then through the bolt opening 48 in the base portion 46.

Figure 2:
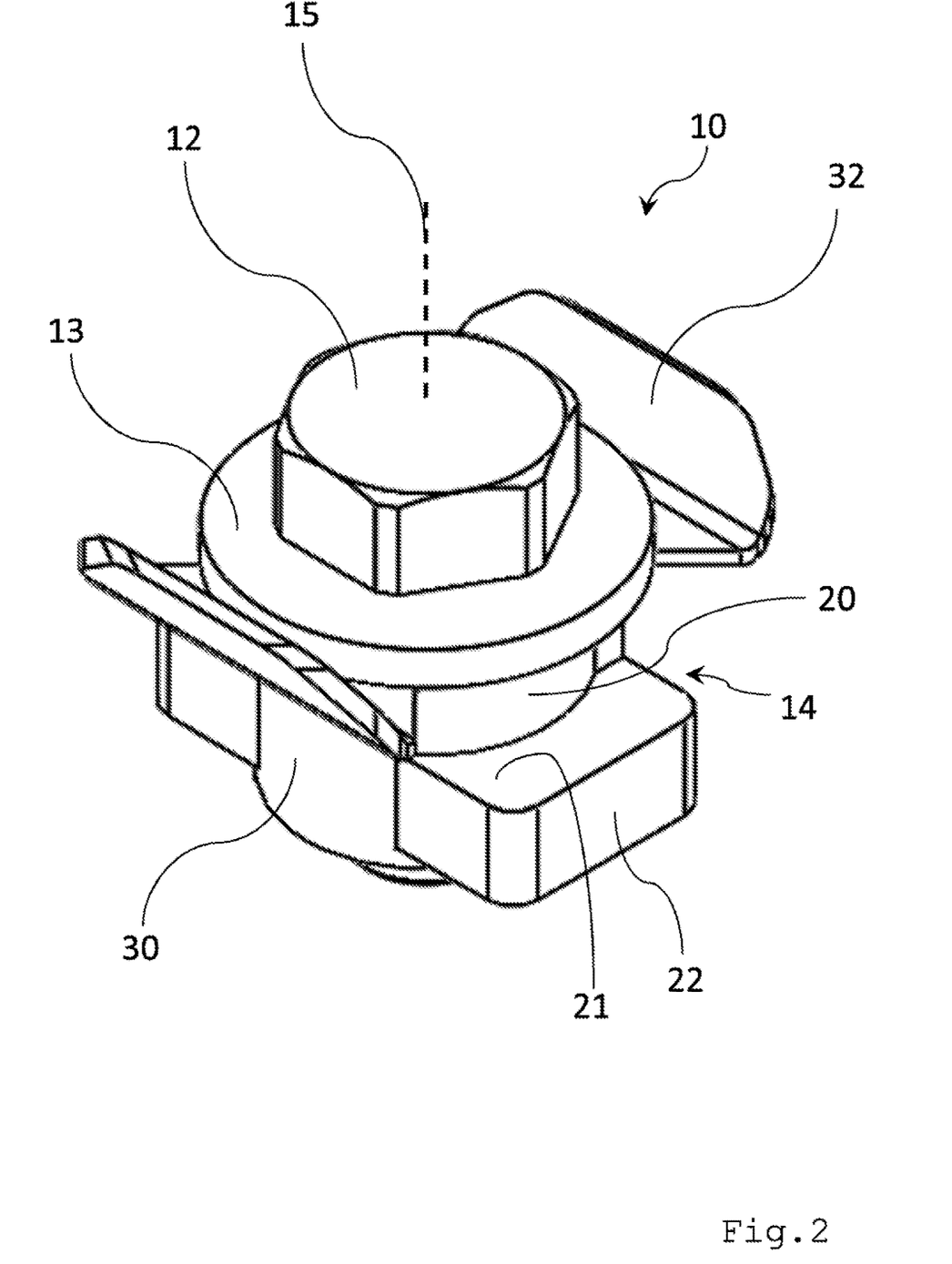
FIG. 2 is a perspective view of the connection system according to FIG. 1 in an assembled state.

FIG. 2 is a perspective view of the connection system 10 according to FIG. 1 in an assembled state. In this state, the nut 14 is received in the cage 16 or in the receiving space 44. The foot portion 22 protrudes, on two opposite sides, from the receiving space 44 or from the cage 16 through the apertures 28. The head portion 20 of the nut 14 is arranged substantially within the receiving space 44. In the example shown, the two projections 32, viewed along the screwing axis 15, are arranged perpendicularly to the directions of passage through the apertures 28.

Figure 3:
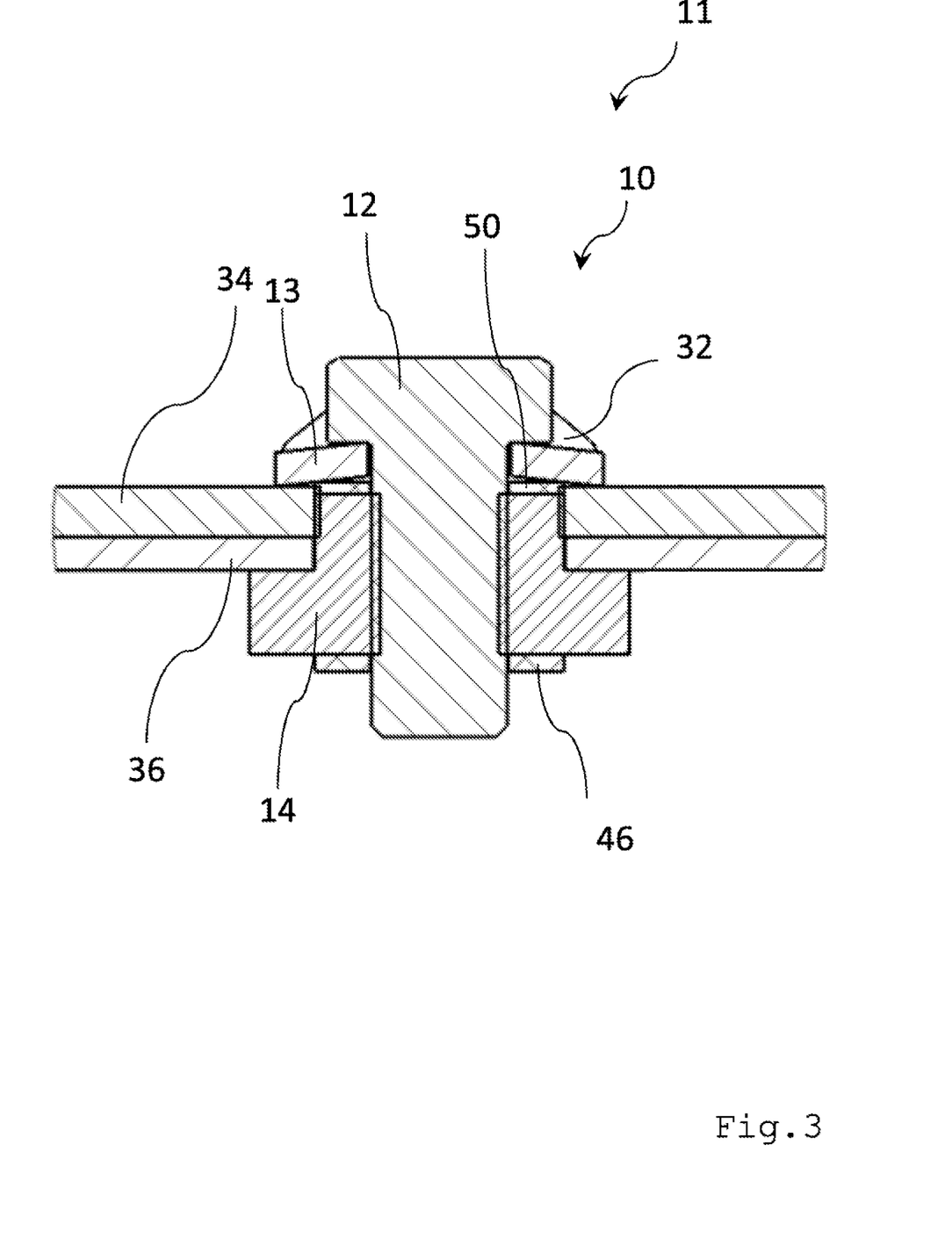
FIG. 3 is a view of a section through the connection system according to FIG. 1 in a state in which two elements are connected.

FIG. 3 is a view of a section through the connection system 10 according to FIG. 1 in a state in which two elements 34, 36 are connected. To connect the two elements 34, 36, the nut 14 is first pushed into the receiving space 44 of the cage 16. The cage 16, with the nut 14 received therein, can be operated by means of the two projections 32 from one side of an element 34, 36 to be connected. In other words, the cage 16, with the nut 14 received therein, can be held from the same side of an element 34, 36 to be connected and the bolt 12 can be screwed into the nut 14.

The elements 34, 36 in the form of plates are interconnected by means of the connection system 10. By turning the bolt 12, said bolt is screwed into the internal thread of the screwing channel 17 provided in the nut 14. As a result, the nut 14 moves toward the bolt head (i.e., upward in FIG. 3). The upper side 21 of the foot portion 22 protruding from the receiving space 44 presses against the second element 36 and presses said second element against the first element 34. The first element 34 is in turn pressed by the washer 13 in the opposite direction (that is to say downward in FIG. 3). The two elements 34, 36 are thus clamped between the foot portion 22 of the nut 14 and the washer 13. Of course, it is the relative movement that is referred to here.

Possible shear forces between the two elements 34 and 36 are absorbed by the head portion 20 of the nut 14. This relieves the bolt or prevents the shear forces between the two elements 34 and 36 from being transmitted to the bolt 12, which can otherwise be the weakest point of a screwed connection.

Figure 4:
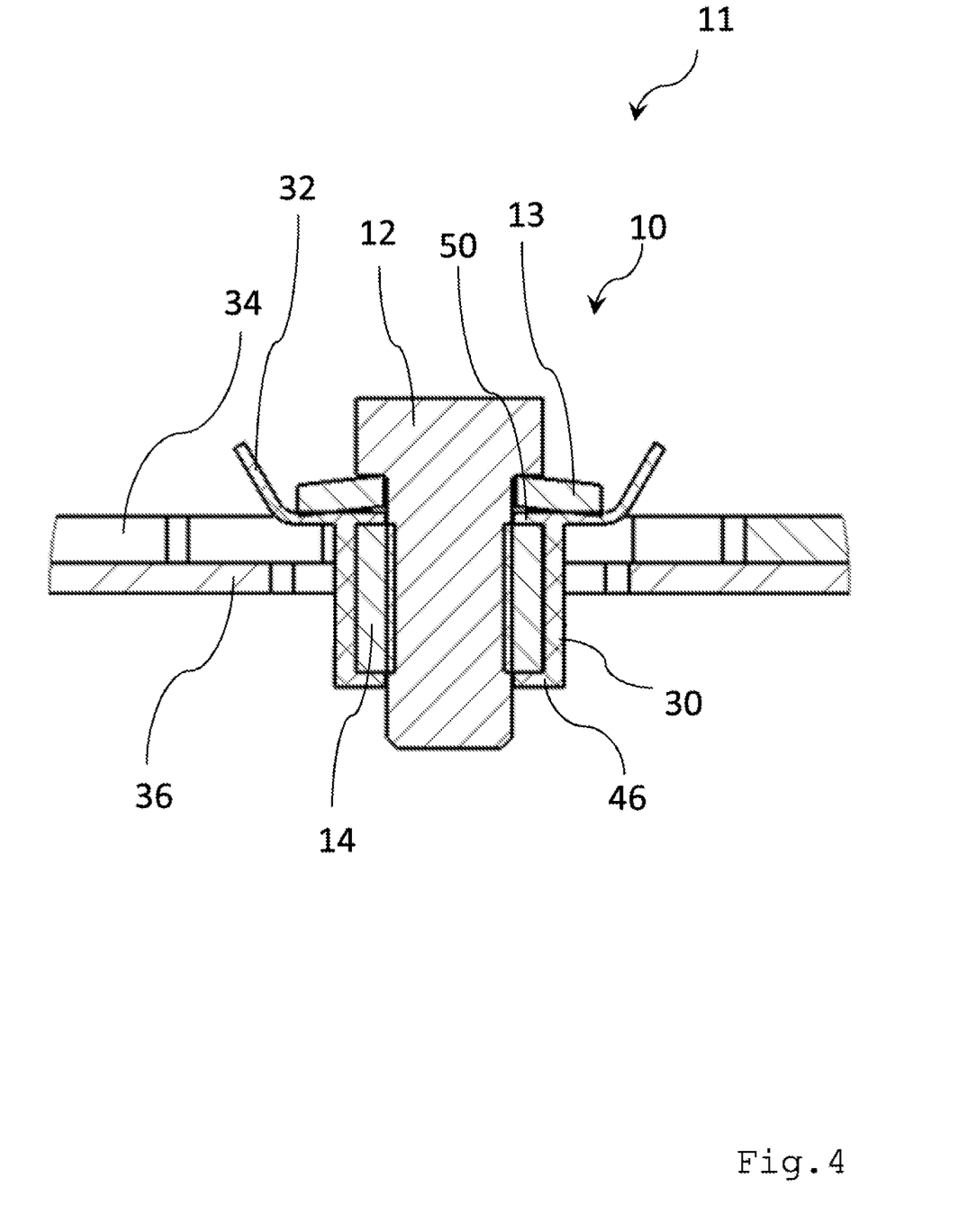
FIG. 4 is a view of a section, arranged perpendicularly to the section in FIG. 3, through the connection system according to FIG. 1 in a state in which two elements are connected.

FIG. 4 is a view of a section, arranged perpendicularly to the section in FIG. 3, through the connection system 10 according to FIG. 1 in a state in which two elements 34, 36 are connected. In the orientation shown, in addition to the head portion 20, the shear forces are also at least partially absorbed by the lateral portion 30. This leads to further relief of the bolt 12.

Figure 5:
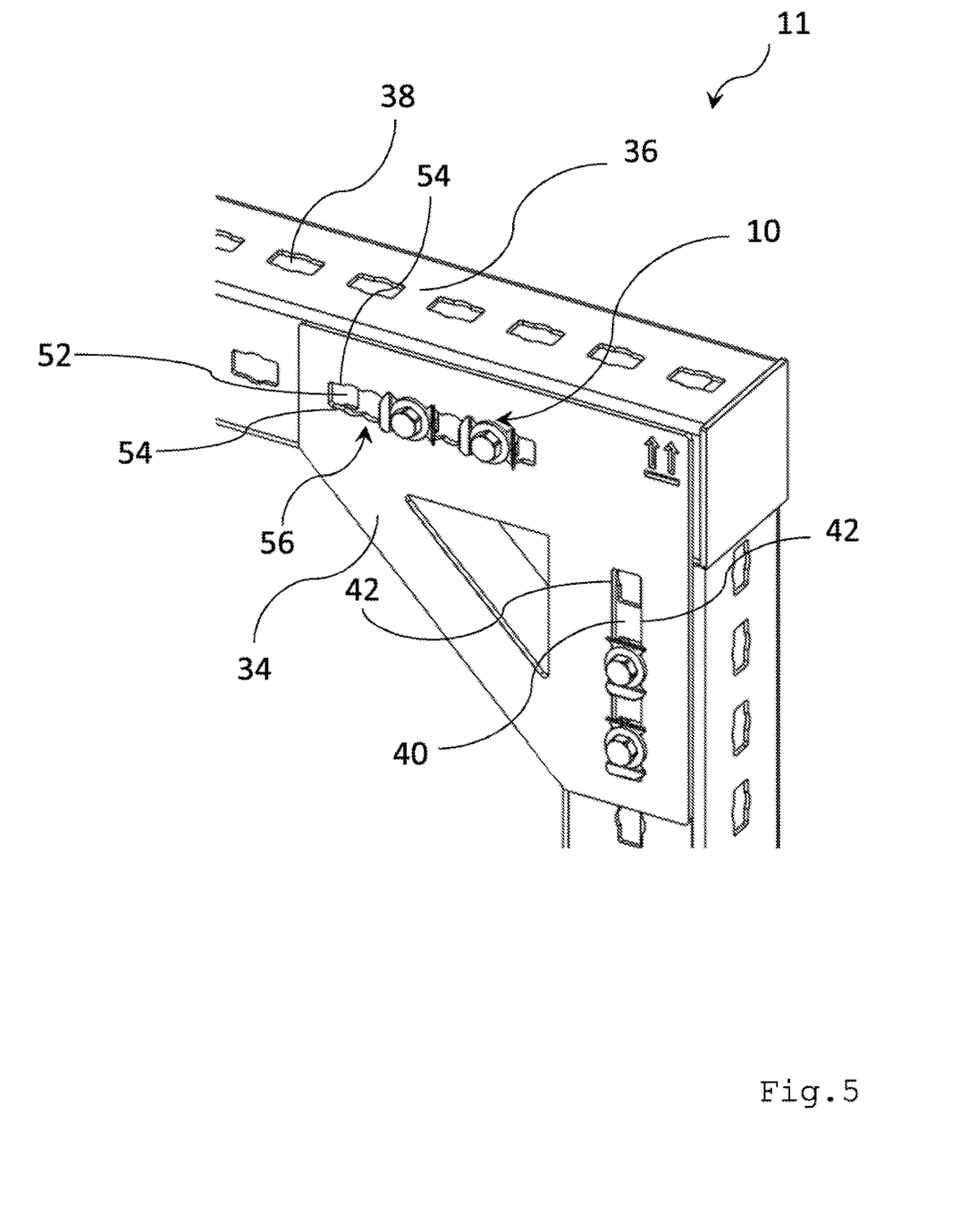
FIG. 5 is a perspective view of an arrangement according to the invention.

FIG. 5 is a perspective view of an arrangement 11 according to the invention. A first element 34 is shown that is in the form of a substantially triangular corner element and a second element 36 that is in the form of an angular profile.

In the present case, the second element 36 has a plurality of holes 38. The holes 38 have a shape which corresponds to the shape of the base portion 46 and the nut 14 when the nut 14 is received in the cage 16 or in the receiving space 44. The connection system 10 can thus be inserted through such a hole 38. In one orientation, the connection system can be inserted through such a hole 38, with insertion in an orientation rotated by 90° preferably being blocked due to the shape of the hole 38. If the connection system 10 is rotated after it has been inserted through the hole 38 by, for example, 90° about the screwing axis 15, the portions of the foot portion 22 of the nut 14 that protrude from the cage 16 or from the receiving space 44 prevent the connection system 10 from being pulled out of the hole 38. In this rotated state, the connection system 10 can interconnect two elements (cf. FIG. 4).

The first element 34 has a first elongate hole 40. The first elongate hole 40 has two long sides 42. The distance between the two long sides 42 of the first elongate hole 40 corresponds to the diameter and thus the widest point of the base portion 46 of the cage 16. The connection system 10 can thus be slid along the first elongate hole 40. When the connection system is inserted through the first elongate hole 40, the connection system 10 can also be slid along the elongate hole 40 after rotation about the screwing axis 15, since the distance between the two sides 42 is correspondingly large.

Furthermore, the first element 34 has a second elongate hole 52. The second elongate hole has two long sides 54, a plurality of points 56 being arranged in the present case along the second elongate hole 52, at which points the distance between the long sides 54 correspond to the diameter and thus the widest point of the base portion 46 of the cage 16. The distance between the long sides 54 is greatest at these points. In this respect, the distance between the long sides 54 is smaller at other points of the second elongate hole 52. The connection system 10 can be inserted into the second elongate hole 52 and pulled out again only at the points 56 (in particular the points having a large distance between the long sides 54). The minimum distance between the long sides 54 corresponds in particular to the width of the head portion 20 of the nut 14 and, optionally, of the surrounding cage.

The connection system 10, with the nut 14 received in the cage 16, can thus be pushed through the second elongate hole 52. After the connection system 10 has been inserted through the second elongate hole 54 at one of the points 56, the connection system 10 is blocked against sliding along the second elongate hole 52. The outer shape of the lateral portion 30 has a shape corresponding to the base portion 46 such that, with the exception of the apertures 28, the lateral portion 30 has a circular-cylindrical outer shape. This has the effect of blocking sliding along the second elongate hole 52.

A rotation by 90° about the screwing axis 15 makes sliding along the second elongate hole 52 possible. By means of such a rotation, the lateral portion 30 of the cage 16 is rotated about the screwing axis 15 such that the apertures 28 in the lateral portion 30 are arranged along the long sides 54. The circular-cylindrical profile of the outer shape of the lateral portion 30 is interrupted by the apertures 28. Due to the apertures 28 in the lateral portion 30, in this orientation the cage 16 has a smaller extent, which can correspond to the minimum distance between the long sides 54. The example shown in FIG. 5 shows a state in which the connection system 10 can be slid along the elongate hole 52.

Figure 6:
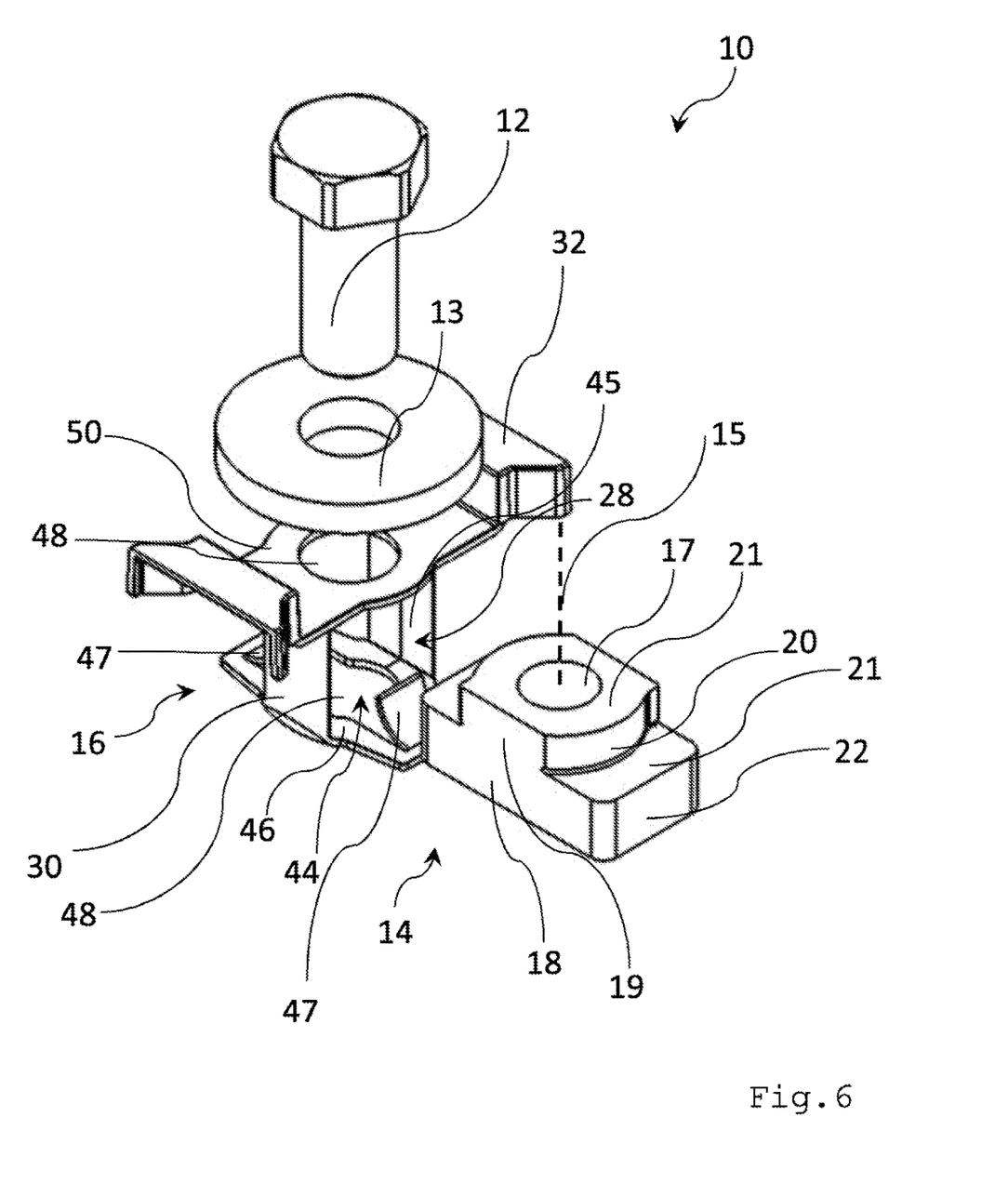
FIG. 6 shows another embodiment of a connection system.

FIG. 6 shows a further embodiment of the connection system 10. In the present case, the base portion 46 is elongate and has two resilient elements 47. Said resilient elements are arranged on opposite sides of the base portion 46 (at the two ends of the long side of the base portion 46) and protrude, with respect to the screwing axis 15, radially inward and upward away from the base portion 46, i.e., into the receiving space 44. The resilient elements 47 are, in particular, resilient projections of the base portion 46. In particular, the resilient elements 47 are designed in the manner of spring tabs or leaf springs. The two resilient elements 47 are generally designed such that they preload the nut 14 toward the bolt 12 when the connection system 10 is in the assembled state, i.e., when the nut 14 is received in the cage 16. In other words, the resilient elements 47 press the nut 14 upward, toward the bolt head.

Figure 7:
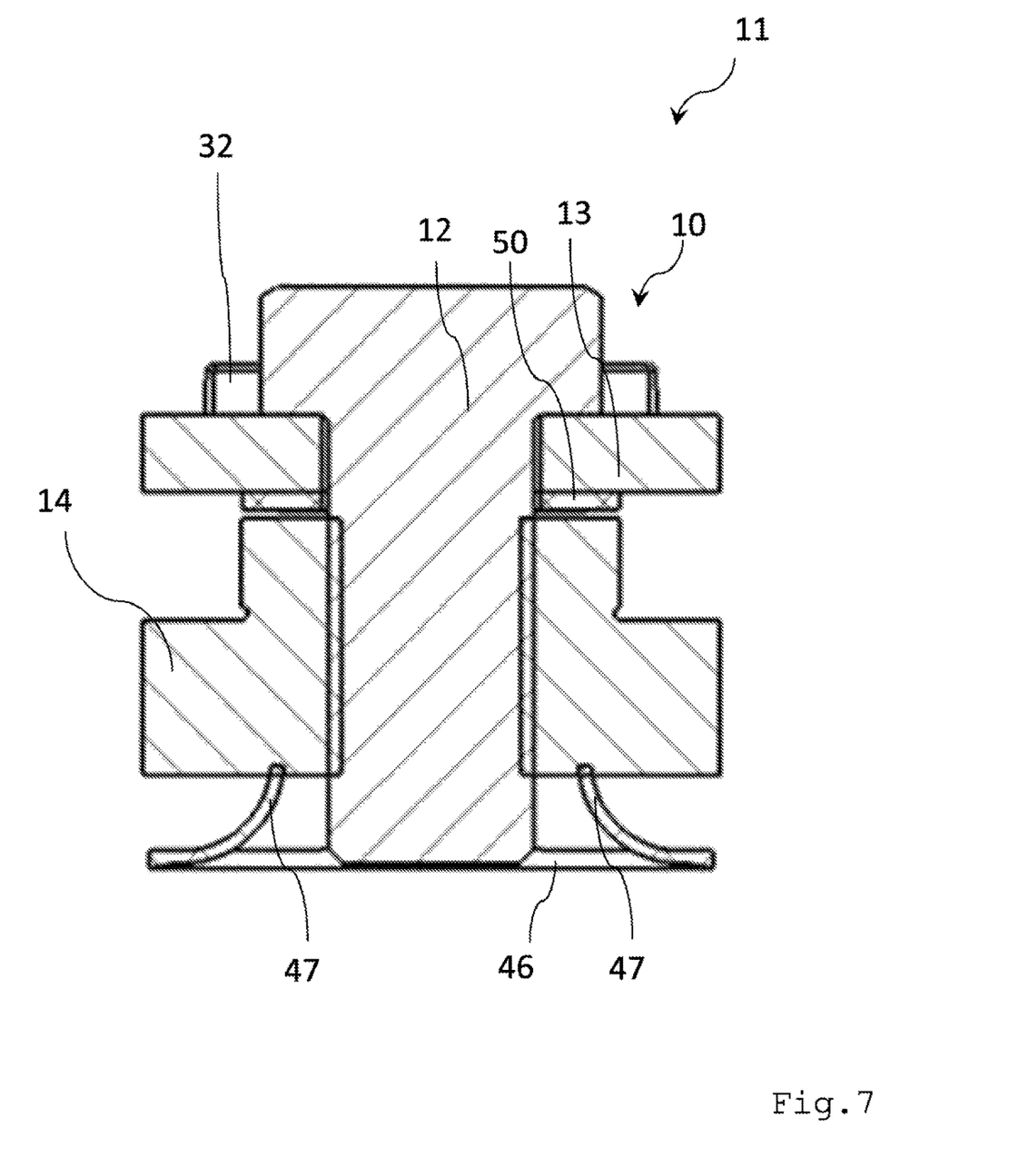
FIG. 7 is a view of a section through the connection system according to FIG. 6.

FIG. 7 is a view of a section through the connection system 10 according to FIG. 6. The assembled state of the connection system 10 is shown in the present case. The resilient elements 47 press the nut 14 toward the bolt head (in particular also away from the base portion 46). In the example shown, the nut 14 is pressed against the cover portion 50 by means of the upper side 21 of the head portion 20. The two resilient elements 47 can be formed in one piece with the base portion 46. In other words, the resilient elements 47 can be part of the base portion 46.

Figure 8:
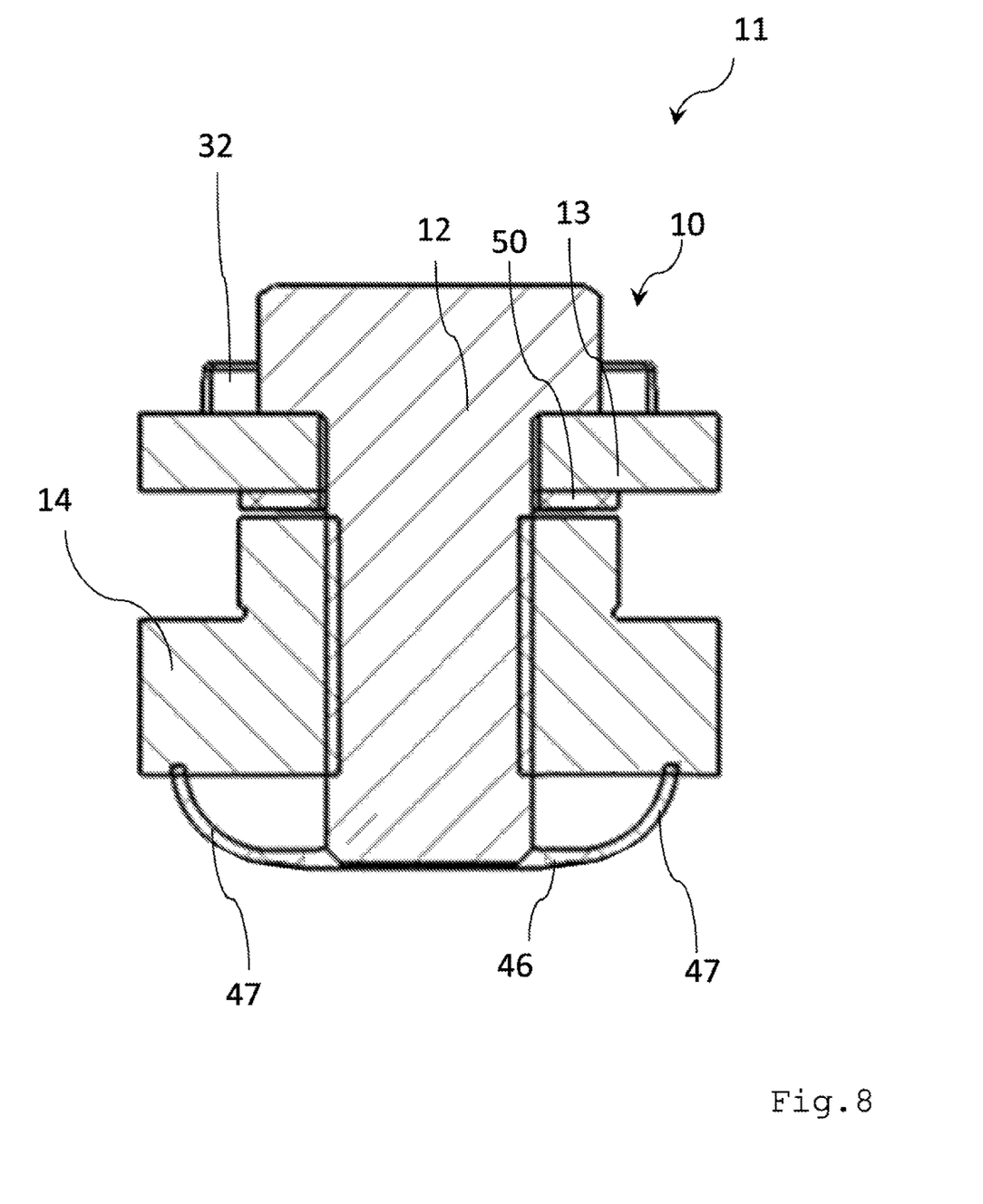
FIG. 8 is a view of a section through a further embodiment of the connection system.

FIG. 8 is a view of a section through a connection system 10 in which the resilient elements 47 do not protrude toward the central longitudinal axis (i.e., into the receiving space 44, radially inward), but rather radially outward (i.e., away from the central longitudinal axis or from the receiving space 44).

What is claimed is:

1. Connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein the cage has a base portion and a lateral portion adjoining the base portion, and delimits a receiving space for the nut, the lateral portion having at least one aperture through which the nut can be pushed into the receiving space at least in part, wherein the cage has a cover portion, the cover portion adjoining the lateral portion and being arranged at a distance from the base portion, wherein a bolt opening for the passage of the bolt is provided in the base portion and/or the cover portion, wherein the cage and the nut are designed such that the nut can be pushed through the aperture in the lateral portion into the receiving space in the direction perpendicular to the screwing axis, such that the screwing channel is aligned with the bolt opening in the base portion and/or the bolt opening in the cover portion.

2. Connection system according to claim 1, characterized in that the foot portion and the head portion of the nut merge into one another in a stepped manner.

3. Connection system according to claim 1, characterized in that the screwing channel extends through the head portion and through the foot portion in the form of a through-opening through the head portion and the foot portion.

4. Connection system according to claim 1, characterized in that the upper side is flat.

5. Connection system according to claim 1, characterized in that the lateral portion of the cage has at least one inner surface facing the receiving space, the inner surface providing a contact surface for a side surface of the foot portion and/or a side surface of the head portion such that when the nut is pushed into the receiving space, the nut is secured against rotation about the screwing axis.

6. Connection system according to claim 1, characterized in that the cage has a cylindrical outer shape.

7. Connection system according to claim 1, characterized in that the base portion and/or the cover portion extend in a flat manner and have a round outer circumference.

8. Connection system according to claim 1, characterized in that, viewed in projection along the screwing axis, the base portion is larger than the cover portion in that the base portion protrudes beyond the cover portion in the region of the aperture.

9. Connection system according to claim 1, characterized in that at least two projections are provided on the cage, which projections adjoin the lateral portion of the cage and/or the cover portion of the cage and extend away from the screwing axis and are arranged rotationally symmetrically and/or opposite one another with respect to the screwing axis.

10. Connection system according to claim 1, characterized in that at least one resilient element is arranged on the base portion such that the resilient element pushes the nut away from the base portion in the assembled state of the connection system.

11. Arrangement comprising a connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein at least one of the at least two plate-like elements has at least one hole, wherein the hole has a shape corresponding to the nut and/or to a base portion of the cage such that the cage, together with the received nut, can be introduced into the hole, wherein the cage has a base portion and a lateral portion adjoining the base portion, and delimits a receiving space for the nut, the lateral portion having at least one aperture through which the nut can be pushed into the receiving space at least in part, wherein the cage has a cover portion, the cover portion adjoining the lateral portion and being arranged at a distance from the base portion, wherein a bolt opening for the passage of the bolt is provided in the base portion and/or the cover portion, wherein the cage and the nut are designed such that the nut can be pushed through the aperture in the lateral portion into the receiving space in the direction perpendicular to the screwing axis, such that the screwing channel is aligned with the bolt opening in the base portion and/or the bolt opening in the cover portion.

12. Arrangement according to claim 11, characterized in that at least one of the at least two plate-like elements has a first elongate hole having two long sides and the distance between the long sides corresponds to the base portion of the cage such that the cage, together with the received nut, can be introduced into the elongate hole and the connection system can be moved along the elongate hole.

13. Arrangement according to claim 11, characterized in that at least one of the at least two plate-like elements has a second elongate hole having two long sides, the second elongate hole having, at least one point, a shape corresponding to the base portion of the cage, the distance between the two long sides at this point being greater than at another point of the second elongate hole, such that the movement of the connection system along the elongate hole can be blocked by rotating the cage by 90° about the screwing axis.

14. Arrangement according to claim 11, characterized in that the connection system, the at least one of the at least two plate-like elements can be positioned such that the two elements can be clamped between the cage and the nut.

15. Connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein the cage has a base portion and a lateral portion adjoining the base portion, and delimits a receiving space for the nut, the lateral portion having at least one aperture through which the nut can be pushed into the receiving space at least in part, wherein the lateral portion of the cage has at least one inner surface facing the receiving space, the inner surface providing a contact surface for a side surface of the foot portion and/or a side surface of the head portion such that when the nut is pushed into the receiving space, the nut is secured against rotation about the screwing axis.

16. Connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein the cage has a base portion and a lateral portion adjoining the base portion, and delimits a receiving space for the nut, the lateral portion having at least one aperture through which the nut can be pushed into the receiving space at least in part, wherein the cage has a cylindrical outer shape.

17. Connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein the cage has a base portion and a lateral portion adjoining the base portion, and delimits a receiving space for the nut, the lateral portion having at least one aperture through which the nut can be pushed into the receiving space at least in part, wherein the base portion and/or the cover portion extend in a flat manner and have a round outer circumference.

18. Connection system for connecting at least two plate-like elements, the connection system comprising a bolt, a nut that corresponds to the bolt and has a screwing channel which extends along a screwing axis and into which the bolt can be screwed, and a cage for receiving the nut, characterized in that the nut has a foot portion and a head portion adjoining said foot portion along the screwing axis, the foot portion projecting, at least in portions, beyond the head portion in a direction perpendicular to the screwing axis, wherein the foot portion has an upper side, wherein the upper side is configured to rest against a surface of the elements for connecting the elements, wherein the cage has a base portion and a lateral portion adjoining the base portion, and delimits a receiving space for the nut, the lateral portion having at least one aperture through which the nut can be pushed into the receiving space at least in part, wherein at least one resilient element is arranged on the base portion such that the resilient element pushes the nut away from the base portion in the assembled state of the connection system.

* * * * *